US009623899B2

(12) United States Patent
Tsubaki et al.

(10) Patent No.: US 9,623,899 B2
(45) Date of Patent: Apr. 18, 2017

(54) ELECTRIC POWER STEERING APPARATUS

(71) Applicant: NSK LTD., Tokyo (JP)

(72) Inventors: Takahiro Tsubaki, Maebashi (JP);
Tetsuya Kitazume, Maebashi (JP);
Yoshiki Ninomiya, Maebashi (JP)

(73) Assignee: NSK LTD., Tokyo (JP)

( * ) Notice: Subject to any disclaimer, the term of this patent is extended or adjusted under 35 U.S.C. 154(b) by 75 days.

(21) Appl. No.: 14/654,628

(22) PCT Filed: Jan. 23, 2014

(86) PCT No.: PCT/JP2014/051323
§ 371 (c)(1),
(2) Date: Jun. 22, 2015

(87) PCT Pub. No.: WO2014/122997
PCT Pub. Date: Aug. 14, 2014

(65) Prior Publication Data
US 2015/0344066 A1 Dec. 3, 2015

(30) Foreign Application Priority Data

Feb. 7, 2013 (JP) .................. 2013-022655
Apr. 30, 2013 (JP) .................. 2013-095993
Dec. 5, 2013 (JP) .................. 2013-251567
Dec. 5, 2013 (JP) .................. 2013-251570

(51) Int. Cl.
B62D 6/08 (2006.01)
B62D 5/04 (2006.01)
(Continued)

(52) U.S. Cl.
CPC .......... *B62D 5/0463* (2013.01); *B62D 1/286* (2013.01); *B62D 6/002* (2013.01); *B62D 6/08* (2013.01); *B62D 15/025* (2013.01); *G05D 1/0061* (2013.01); *B60W 2050/007* (2013.01); *G05D 2201/0213* (2013.01)

(58) Field of Classification Search
None
See application file for complete search history.

(56) References Cited

U.S. PATENT DOCUMENTS 9,327,761 B2 * 5/2016 Tsubaki ............... B62D 5/0463
9,387,877 B2 * 7/2016 Tsubaki ............... B62D 1/286
(Continued)

FOREIGN PATENT DOCUMENTS

JP 08-310417 A 11/1996
JP 10-250614 A 9/1998
(Continued)

OTHER PUBLICATIONS

International Search Report of PCT/JP2014/051323 dated Apr. 22, 2014 [PCT/ISA/210].

Primary Examiner — Redhwan K Mawari
Assistant Examiner — Edward Torchinsky
(74) Attorney, Agent, or Firm — Sughrue Mion, PLLC

(57) ABSTRACT

An electric power steering apparatus that detects that a driver has steered the handle by using a steering torque detected by a torque sensor, switches to the manual steering mode due to a capacity (an integrated value) corresponding to a generated torque, and does not provide an uncomfortable feeling to the driver.

22 Claims, 18 Drawing Sheets

(51) Int. Cl.
  *B62D 6/00*  (2006.01)
  *B62D 15/02* (2006.01)
  *G05D 1/00*  (2006.01)
  *B62D 1/28*  (2006.01)
  *B60W 50/00* (2006.01)

(56) References Cited

U.S. PATENT DOCUMENTS

| 9,446,789 B2* | 9/2016 | Tsubaki | B62D 15/0285 |
|---|---|---|---|
| 2003/0050748 A1* | 3/2003 | Iwazaki | B62D 15/0285 |
| | | | 701/41 |
| 2006/0089770 A1* | 4/2006 | Ito | B62D 1/286 |
| | | | 701/41 |
| 2010/0001680 A1* | 1/2010 | Sasaki | B62D 5/046 |
| | | | 318/675 |
| 2010/0198462 A1* | 8/2010 | Shinoda | B62D 5/046 |
| | | | 701/41 |
| 2014/0163822 A1* | 6/2014 | Strecker | B62D 6/04 |
| | | | 701/42 |
| 2015/0066303 A1* | 3/2015 | Kodera | B62D 5/049 |
| | | | 701/42 |
| 2015/0191199 A1* | 7/2015 | Tsubaki | B62D 1/286 |
| | | | 701/42 |
| 2015/0217801 A1* | 8/2015 | Takeda | B62D 6/008 |
| | | | 701/42 |
| 2015/0344066 A1* | 12/2015 | Tsubaki | B62D 1/286 |
| | | | 701/41 |

FOREIGN PATENT DOCUMENTS

| JP | 2002-369565 A | 12/2002 |
|---|---|---|
| JP | 2004-017881 A | 1/2004 |
| JP | 2005-112103 A | 4/2005 |
| JP | 3845188 B2 | 11/2006 |
| JP | 2007-069855 A | 3/2007 |
| JP | 2007-166861 A | 6/2007 |
| JP | 2011-016435 A | 1/2011 |
| JP | 2012-011862 A | 1/2012 |
| JP | 2012-201333 A | 10/2012 |

* cited by examiner

PRIOR ART

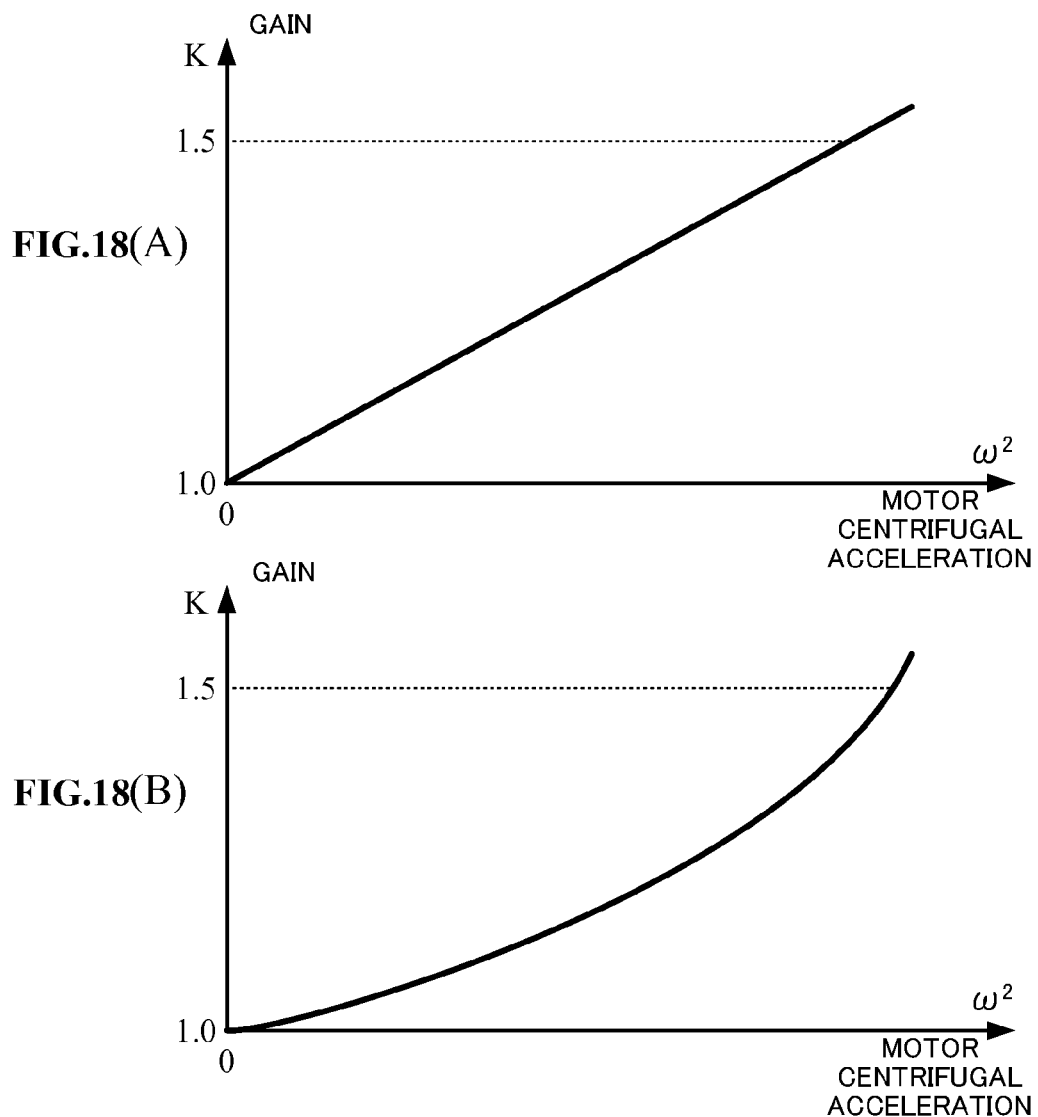

ELECTRIC POWER STEERING APPARATUS

CROSS REFERENCE TO RELATED APPLICATIONS

This application is a National Stage of International Application No. PCT/JP2014/051323, filed Jan. 23, 2014, claiming priorities based on Japanese Patent Application Nos. 2013-022655, filed Feb. 7, 2013, 2013-095993, filed Apr. 30, 2013, 2013-251567, filed Dec. 5, 2013 and 2013-251570, filed Dec. 5, 2013, the contents of all of which are incorporated herein by reference in their entirety.

TECHNICAL FIELD

The present invention relates to an electric power steering apparatus that has functions of an automatic steering mode (parking support mode) and a manual steering mode and provides a steering system of a vehicle with an assist force generated by a motor, and in particular to an electric power steering apparatus capable of improving a performance of a switching-judgement from the automatic steering mode to the manual steering mode.

BACKGROUND ART

An electric power steering apparatus (EPS) which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel (a handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a steering assist command value of an assist (steering assist) command based on a steering torque Th detected by the torque sensor 10 and a vehicle speed Vel detected by a vehicle speed sensor 12, and controls a current supplied to the motor 20 on the basis of a current control value E obtained by performing compensation and so on with respect to the steering assist command value. Moreover, it is also possible to receive the vehicle speed Vel from a controller area network (CAN) and so on.

In such the electric power steering apparatus, the control unit 100 has a configuration such as disclosed in Japanese Published Unexamined Patent Application No. 2002-369565 A.

As shown in FIG. 2, the motor 20 for generating the steering assist torque of the steering apparatus is driven by a motor driving section 21, the motor driving section 21 is controlled by the control unit 100 indicated by a dashed-two dotted line, and the steering torque Th from the torque sensor 10 and the vehicle speed Vel from a vehicle speed detecting system are inputted into the control unit 100. In the motor 20, a motor inter-terminal voltage Vm and a motor current value i are measured and outputted.

The control unit 100 comprises a torque system control unit 110 indicated by a dashed line that performs a control by using the steering torque Th and a motor system control unit 120 indicated by a dashed-dotted line that performs a control relating to driving of the motor 20. The torque system control unit 110 comprises an assist amount calculating section 111, a differential control section 112, a yaw-rate convergence control section 113, a robust stabilization compensating section 114 and a self-aligning torque (SAT) estimation feedback section 115, addition sections 116A and 116B, and a subtraction section 116C. Further, the motor system control unit 120 comprises a compensating section 121, a disturbance estimating section 122, a motor angular speed calculating section 123, a motor angular acceleration calculating section 124, a motor characteristic compensating section 125, and addition sections 126A and 126B.

The steering torque Th is inputted into the assist amount calculating section 111, the differential control section 112, the yaw-rate convergence control section 113 and the SAT estimation feedback section 115, and all of them input the vehicle speed Vel as a parameter. The assist amount calculating section 111 calculates an assist torque amount based on the steering torque Th. The yaw-rate convergence control section 113 inputs the steering torque Th and a motor angular speed ω, and brakes a movement that the steering wheel whirls to improve the convergence of yaw of the vehicle. Further, the differential control section 112 enhances a control responsibility in the vicinity of a neutral point of the steering and realizes a smooth steering. Moreover, the SAT estimation feedback section 115 inputs the steering torque Th, a signal obtained in the addition section 116A by adding the output of the differential control section 112 to the output of the assist amount calculating section 111, the motor angular speed ω calculated by the motor angular speed calculating section 123 and a motor angular acceleration α from the motor angular acceleration calculating section 124 to estimate an SAT, performs a signal processing by using a feedback filter with respect to the estimated SAT, and provides the steering wheel with suitable road information as a reaction force.

Further, a signal that is obtained in the addition section 116B by adding the output of the yaw-rate convergence control section 113 to a signal obtained in the addition section 116A by adding the output of the differential control section 112 to the output of the assist amount calculating section 111, is inputted into the robust stabilization compensating section 114 as an assist amount AQ. For example, the robust stabilization compensating section 114 is a compensating section disclosed in Japanese Published Unexamined Patent Application No. H8-290778 A, removes a peak value in a resonance frequency of a resonance system comprised of an inertia element and a spring element that are included in the detected torque, and compensates a phase shift of the resonance frequency that disturbs the responsibility and the stability of the control system. By subtracting the output of the SAT estimation feedback section 115 from the output of the robust stabilization compensating section 114 in the subtraction section 116C, an assist amount Ia capable of transmitting the road information to the steering wheel as the reaction force, is obtained.

Moreover, the motor angular speed calculating section 123 calculates the motor angular speed ω based on the motor inter-terminal voltage Vm and the motor current value i, and the motor angular speed ω is inputted into the motor angular acceleration calculating section 124, the yaw-rate convergence control section 113 and the SAT estimation feedback section 115. The motor angular acceleration calculating section 124 calculates the motor angular acceleration α based on the inputted motor angular speed ω, and the calculated motor angular acceleration α is inputted into the motor characteristic compensating section 125 and the SAT estimation feedback section 115. In the addition sections 126A, the assist amount Ia obtained by subtracting the output of the SAT estimation feedback section 115 from the output of the robust stabilization compensating section 114, is added to the output Ic of the motor characteristic compensating section 125, and then this added signal is inputted into the compensating section 121 comprised of a differential compensating section or the like as a current command value Ir. A signal that is obtained by adding the output of the disturbance estimating section 122 in the addition section 126B to a current command value Ira obtained by compensating the current command value Ir by means of the compensating section 121, is inputted into the motor driving section 21 and the disturbance estimating section 122. The disturbance estimating section 122 is an apparatus disclosed in Japanese Published Unexamined Patent Application No. H8-310417 A, is capable of maintaining a desired motor control characteristic in an output reference of the control system based on a signal obtained by adding the output of the disturbance estimating section 122 to the current command value Ira compensated by the compensating section 121 that is the control target of the motor output and the motor current value i, and does not lose the stability of the control system.

In such an electric power steering apparatus, recently, there has been appeared the vehicles equipped with a parking support function (parking assist) that switch between the automatic steering mode and the manual steering mode. In a vehicle equipped with the parking support function, a target steering angle is set based on data from a camera (image), a distance sensor or the like, and the automatic steering control which makes an actual steering angle follow up the target steering angle, is performed.

In an electric power steering apparatus having conventionally well-known functions of the automatic steering mode (parking support mode) and the manual steering mode, a back parking and a parallel parking are performed automatically by controlling an actuator (a motor) base on a pre-stored relation between a moving distance of the vehicle and a turning angle.

Then, a conventional steering control apparatus stops the automatic steering control when a driver operates the steering wheel during the automatic steering mode and the steering torque exceeds a predetermined value. However, if the judgment is performed only by comparing an output of the torque sensor with a predetermined value, the output of the torque sensor sometime and temporarily exceeds the predetermined value due to the noise of the torque sensor, or due to an inertia torque of the steering wheel when the tires tread on pebbles or the automatic steering using the motor is performed. Therefore, there is a problem that the automatic steering control is stopped at each time of the above matters. If the predetermined value is set to a high level in order to avoid such impropriety, the driver has an uncomfortable feeling by interfering the automatic steering mode and the manual steering mode each other, and further there is a possibility that the automatic steering control is not immediately stopped even if the driver steers the steering wheel during the automatic steering control.

As the automatic steering apparatus to solve the problem, for example, Japanese Patent No. 3845188 B2 (Patent Document 1) is proposed. The apparatus disclosed in Patent Document 1 comprises a movement-locus setting means to store or obtain a movement-locus of the vehicle to a target position, an actuator (motor) to steer the wheels, a steering torque detecting means (torque sensor) to detect the steering torque applied to the steering wheel by the driver, and an actuator control means to control the driving of the actuator based on the movement-locus set by the movement-locus setting means and to stop the control of the actuator based on the movement-locus when the steering torque being equal to or more than a predetermined value which is in advance set is detected during times being equal to or more than a predetermined time. Then, the above apparatus sets plural kinds of predetermined values and changes the predetermined times in correspondence to respective predetermined values.

THE LIST OF PRIOR ART DOCUMENTS

Patent Documents

Patent Document 1: Japanese Patent No. 3845188 B2

SUMMARY OF THE INVENTION

Problems to be Solved by the Invention

However, according to the apparatus disclosed in Patent Document 1, if the predetermined time corresponding to the steering torque of the driver elapses, the automatic steering control is stopped. There is a complication that plural kinds of the predetermined values are set and the predetermined time is changed in correspondence to the predetermined values, and further it has a problem that the calculation capacity is great.

The present invention has been developed in view of the above-described circumstances, and an object of the present invention is to provide an electric power steering apparatus that has functions of an automatic steering mode and a manual steering mode, detects that the driver steers the steering wheel (handle) during the automatic steering mode, by using the steering torque from the torque sensor, and switches to the manual steering mode when a capacity (an integrated value) corresponding to a generated torque is equal to or more than a predetermined value. Especially, the present invention relates to the high performance electric power steering apparatus that rapidly switches when the steering torque, or a motor state information (motor angular speed (rotation speed), a motor angular acceleration or a motor centrifugal acceleration) is large and does not give an uncomfortable feeling to the driver.

Means for Solving the Problems

The present invention relates to an electric power steering apparatus that calculates a motor current command value 1 based on a steering torque and a vehicle speed, performs an assist control of a steering system by driving a motor on a basis of the motor current command value 1, and has a function for switching between an automatic steering mode and a manual steering mode, the above-described object of the present invention is achieved by that comprising: a steering angle control section that calculates a motor current command value 2 so as to bring an actual steering angle close to a target steering angle; a torque integral judging section to output a steering torque judging signal by integrating the steering torque and comparing with a predetermined threshold; and a switching section that inputs the motor current command value 1 and the motor current command value 2, and is switched by a switching signal or the steering torque judging signal, wherein the torque integral judging section comprises: a torque value comparing section to output a predetermined signal by comparing an absolute value of the steering torque with a torque threshold; a torque-sensitive type gain section to input the predetermined signal and output an integral input value corresponding to the steering torque; an integral calculating section to integrate the integral input value from the torque-sensitive type gain section; and a switch judging section to output the steering torque judging signal by comparing an integrated value from the integral calculating section with an integral threshold, wherein the switching section is switched in correspondence with a switching command of the automatic steering mode and the manual steering mode, or the steering torque judging signal.

Further, the present invention relates to an electric power steering apparatus that calculates a motor current command value 1 based on a steering torque and a vehicle speed, performs an assist control of a steering system by driving a motor on a basis of the motor current command value 1, and has a function for switching between an automatic steering mode and a manual steering mode, the above-described object of the present invention is achieved by that comprising: a steering angle control section that calculates a motor current command value 2 so as to bring an actual steering angle close to a target steering angle; a torque integral judging section to output a steering torque judging signal by integrating the steering torque and comparing with a predetermined threshold; and a switching section that inputs the motor current command value 1 and the motor current command value 2, and is switched by a switching signal or the steering torque judging signal, wherein the torque integral judging section comprises: a torque value comparing section to output a predetermined signal by comparing an absolute value of the steering torque with a torque threshold; a motor-state information-sensitive type gain section to input the predetermined signal and output an integral input value corresponding to a motor-state information; an integral calculating section to integrate the integral input value from the motor-state information-sensitive type gain section; and a switch judging section to output the steering torque judging signal by comparing an integrated value from the integral calculating section with an integral threshold, wherein the switching section is switched in correspondence with a switching command of the automatic steering mode and the manual steering mode, or the steering torque judging signal.

The above-described object of the present invention is also achieved by that wherein the motor-state information-sensitive type gain section is a motor angular speed-sensitive type gain section, or a motor angular acceleration-sensitive type gain section, or a motor centrifugal acceleration-sensitive type gain section.

Effects of the Invention

The electric power steering apparatus according to the present invention in the vehicle having the automatic steering mode (the parking support mode) and the manual steering mode, when the steering torque becomes to be equal to or more than the predetermined torque threshold, integrates the steering torque with a great gain becoming great as the steering torque or the motor-state information (the motor angular speed, the motor angular acceleration or the motor centrifugal acceleration) becomes great, and further performs the switching control of the modes by comparing the magnitude of the integrated value with the predetermined integral threshold. Accordingly, it is possible to shorten a time for the switching judgement as the steering torque is great and further as the motor-state information is great.

Since the present invention judges the switching control with the integrated value of the steering torque, without the passage of the time, the driver does not especially feel the uncomfortable feeling even at the switching from the automatic steering mode to the manual steering mode.

Further, it is not necessary to have plural threshold values for the steering torque and plural setting values for the judgment time, the present invention has effects that the configuration is simple and the calculation load is light.

BRIEF DESCRIPTION OF THE DRAWINGS

In the accompanying drawings:

FIGS. 18(A) and 18(B) are diagrams showing characteristic examples (linear, non-linear) of the motor centrifugal acceleration-sensitive type gain section.

MODE FOR CARRYING OUT THE INVENTION

In the present invention, the electric power steering apparatus in the vehicle having the automatic steering mode and the manual steering mode detects, with the steering torque from the torque sensor, that a driver steers the steering wheel (handle) during the automatic steering mode, and switches to the manual steering mode when a capacity (an integrated value) corresponding to the magnitude of a generated torque is equal to or more than a predetermined value. Accordingly, according to the present invention, the driver does not feel an uncomfortable feeling under any conditions.

Since the present invention judges the mode switching control with the integrated value of the steering torque, without the passage of the time, the driver does not especially feel the uncomfortable feeling even at a time when the mode is switched from the automatic steering mode to the manual steering mode. Further, it is possible to shorten a time to be necessary for the switching judgment as the motor-state information (the motor angular speed, the motor angular acceleration or the motor centrifugal acceleration) is great, and a secure mode switching control is capable of performing.

Hereinafter, embodiments of the present invention will be described in detail with reference to the accompanying drawings.

Figure 1:
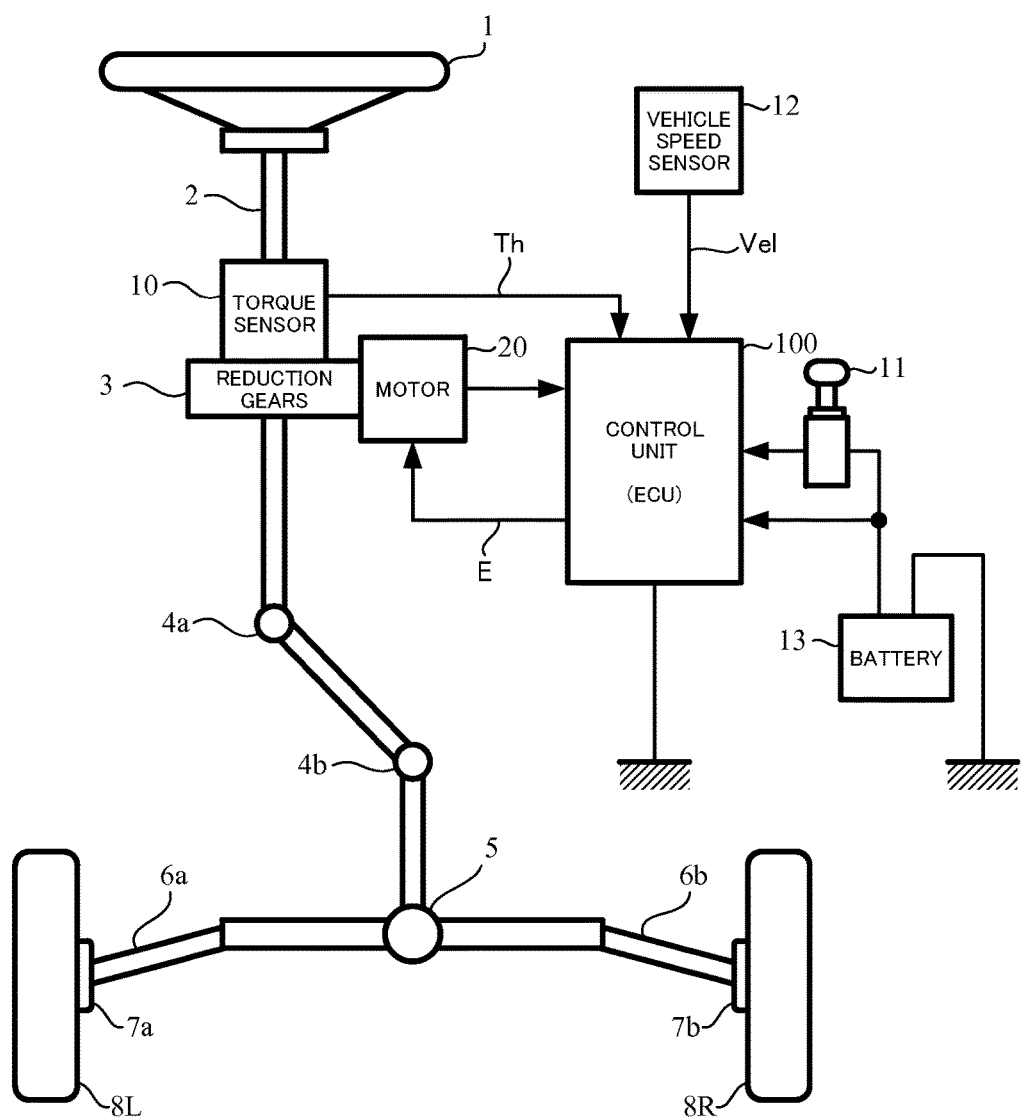
FIG. 1 is a configuration diagram illustrating a general outline of an electric power steering apparatus.
Figure 2:
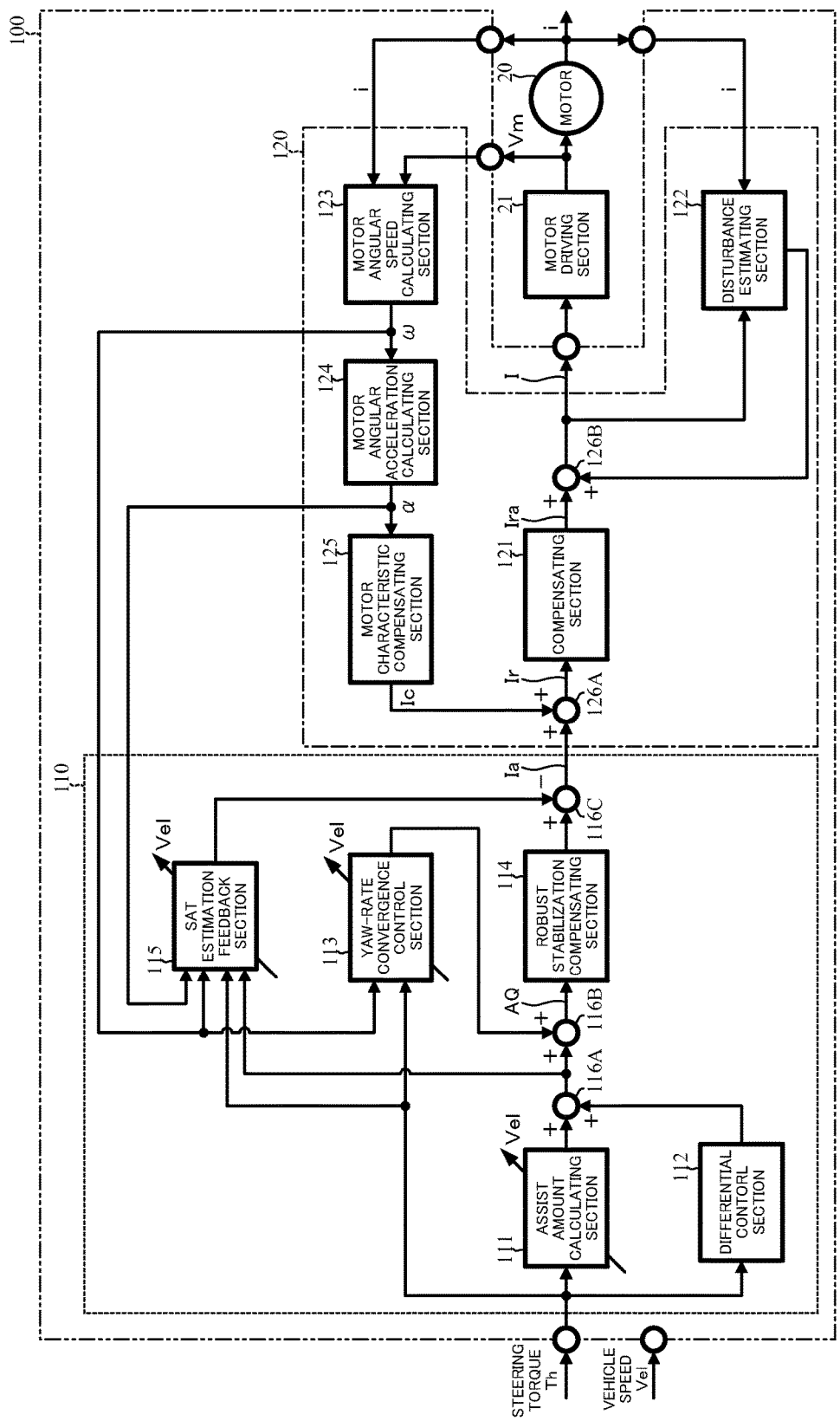
FIG. 2 is a block diagram showing a configuration example of a control system of a conventional electric power steering apparatus.
Figure 3:
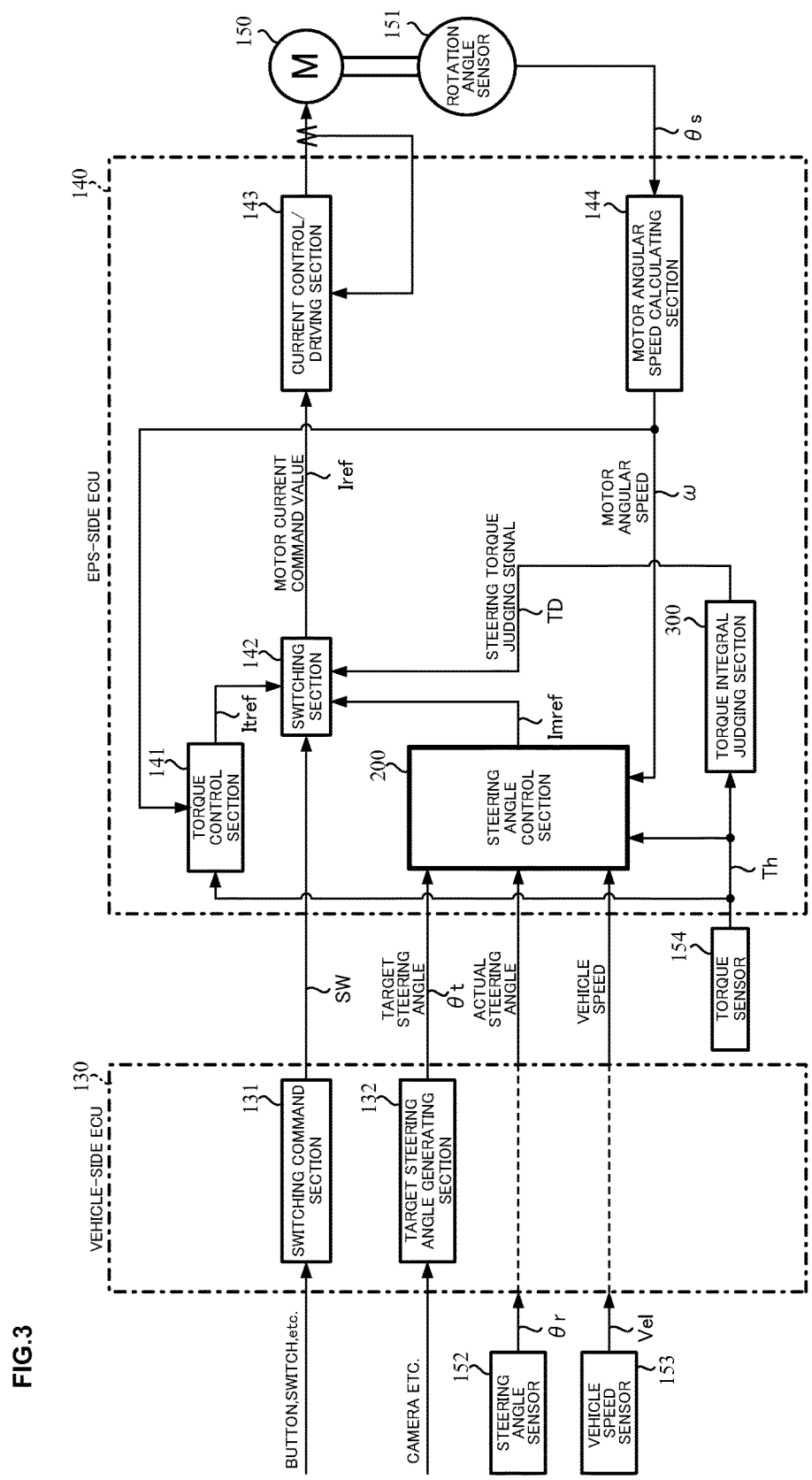
FIG. 3 is a block diagram showing a configuration example (the first embodiment) of the present invention.

FIG. 3 is a block diagram showing a configuration example (the first embodiment) of the present invention. As shown in FIG. 3, a rotation angle sensor 151 for detecting a motor rotation angle θs, such as a resolver, is connected to a motor 150, and the motor 150 is drive-controlled via a vehicle-side ECU 130 and an electric power steering apparatus (EPS)-side ECU 140.

The vehicle side ECU 130 comprises a switching command section 131 that outputs a switching command SW of the automatic steering mode or the manual steering mode by using a button, a switch or the like indicating the intention of a driver and a target steering angle generating section 132 that generates a target steering angle θt based on a signal from a camera (image), a distance sensor or the like. Further, an actual steering angle θr detected by a steering angle sensor 152 provided on the column shaft (the handle shaft), is inputted into a steering angle control section 200 within the EPS-side ECU 140 through the vehicle-side ECU 130. The steering angle sensor 152 may be a steering angle estimation value based on the column shaft (including an intermediate shaft, a pinion shaft), the displacement of rack of the rack and pinion or a wheel speed. Furthermore, it is also possible to receive the vehicle speed Vel from CAN and so on.

The switching command section 131 outputs the switching command SW based on a signal that identifies entering the automatic steering mode, for example, based on the button or the switch indicating the intention of the driver that is provided on a dashboard or on the periphery of the steering wheel, or a vehicle state signal represented by a parking mode or the like provided on the shift, and then the switching command SW is inputted into a switching section 142 within the EPS-side ECU 140. Further, the target steering angle generating section 132 generates the target steering angle θt based on data from the camera (image), the distance sensor or the like by means of a publicly-known method, and inputs the generated target steering angle θt into the steering angle control section 200 within the EPS-side ECU 140.

The EPS-side ECU 140 comprises a torque control section 141 that outputs a motor current command value Itref calculated based on a steering torque Th from a torque sensor 154 and a motor angular speed ω, the steering angle control section 200 that calculates a motor current command value Imref for performing the steering automatic control based on the target steering angle θt, the actual steering angle θr, the vehicle speed Vel, the steering torque Th and the motor angular speed ω and outputs the calculated motor current command value Imref, the switching section 142 that switches between the motor current command values Itref and Imref depending on the switching command SW from the switching command section 131 or a steering torque judging signal TD and outputs a motor current command values Iref, a current control/driving section 143 that drive-controls the motor 150 based on the motor current command value Iref (Itref or Imref) from the switching section 142, a motor angular speed calculating section 144 that calculates the motor angular speed ω based on the motor rotation angle θs from the rotation angle sensor 151, and the torque integral judging section 300 to output the steering torque judging signal TD based on the steering torque Th.

The switching section 142 switches between a torque control mode (the manual steering mode) by the torque control section 141 and the automatic steering mode by the steering angle control section 200 based on the switching command SW from the switching command section 131 of the vehicle-side ECU 130 or the steering torque judging signal TD from the torque integral judging section 300, in the manual steering mode, outputs the motor current command value Itref as the motor current command value Iref, and in the automatic steering mode, outputs the motor current command value Imref as the motor current command value Iref. Further, the current control/driving section 143 comprises a PI current control section, a PWM control section, an inverter and so on.

Figure 4:
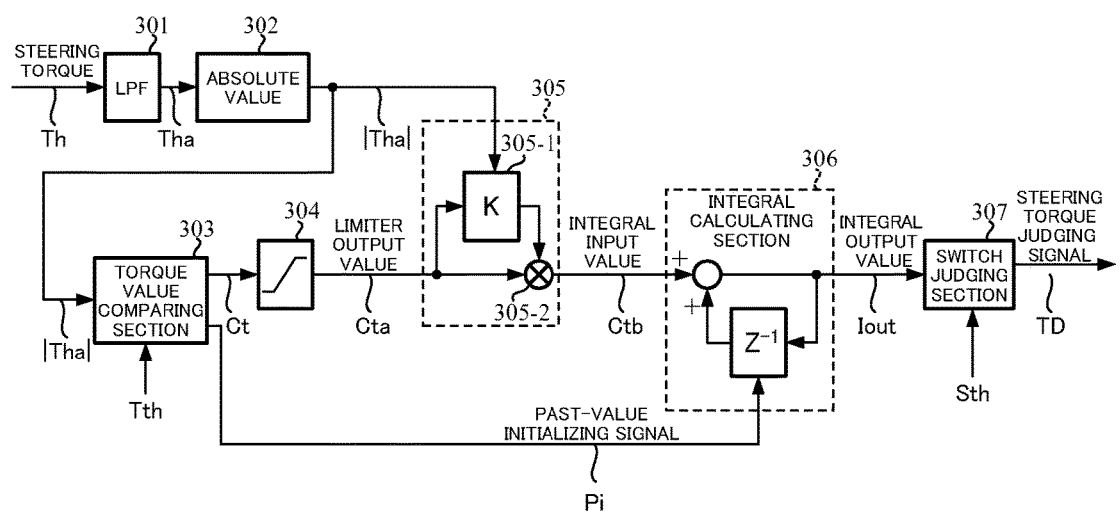
FIG. 4 is a block diagram showing one configuration example of the torque integral judging section.

The torque integral judging section 300 has a configuration shown in FIG. 4. As shown in FIG. 4, the torque integral judging section 300 comprises a low pass filter (LPF) 301 to remove the noise of the steering torque Th, an absolute value section 302 to obtain an absolute value |Tha| of the steering torque Tha outputted from the LPF 301, a torque value comparing section 303 to output an output signal Ct or a past-value initializing signal Pi by comparing the absolute value |Tha| of the steering torque Tha with a predetermined torque threshold Tth, a limiter 304 to limit the upper and lower limit values of the output signal Ct so as not to input an excessive signal, a torque-sensitive type gain section 305 to input the limiter output value Cta from the limiter 304 and to output an integral input value Ctb by multiplying a gain being sensitive to an absolute value |Tha| of the steering torque Th, an integral calculating section 306 to integrate the integral input value Ctb, and a switch judging section 307 to output a steering torque judging signal TD by comparing an integral output value Iout integrated in the integral calculating section 306 with a predetermined integral threshold Sth.

In order to avoid that the automatic steering control is switched or the switching operation becomes difficult in a case the steering torque Th temporarily excesses a predetermined value or the steering torque Th is less than the predetermined value when a tire collides with a curbstone or a stone or the like, the LPF 301 to remove the noise of the steering torque Th is provided. The torque value comparing section 303 compares the absolute value |Tha| with the torque threshold Tth, performs the integral operation when the absolute value |Tha| is equal to or more than the torque threshold Tth, and initializes the integrated value to "0" when the absolute value |Tha| is less than the torque threshold Tth. Namely, the torque value comparing section 303 operates as the following table 1.

TABLE 1

If | Tha | ≥ Tth, then the output signal Ct = | Tha |.
If | Tha | < Tth, then the output signal Ct = 0 and the past-value initializing signal Pi is outputted.

Figure 5A:
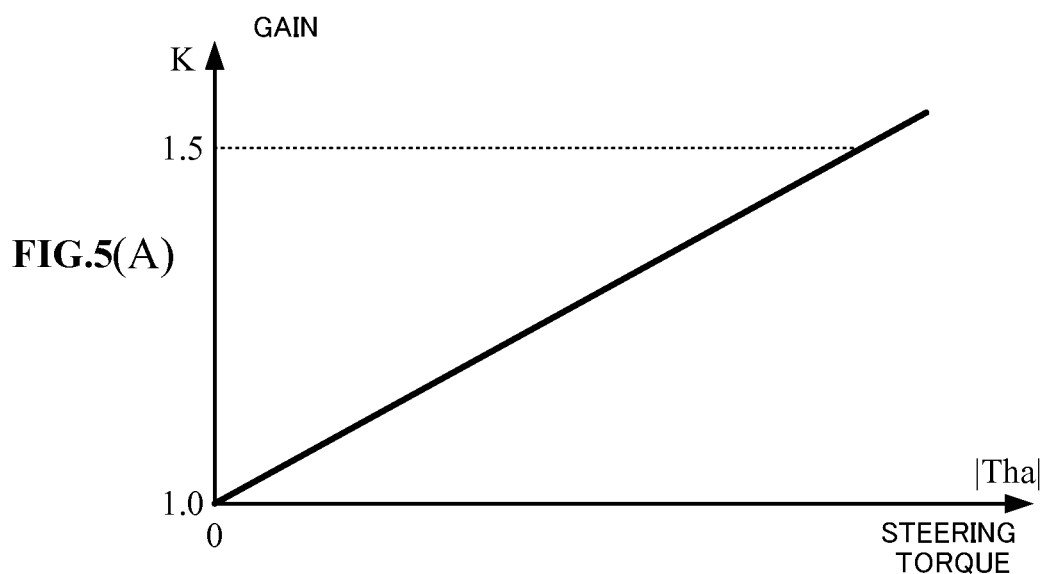
FIGS. 5(A) and 5(B) are diagrams showing characteristic examples (linear, non-linear) of the steering torque-sensitive type gain section.
Figure 5B:
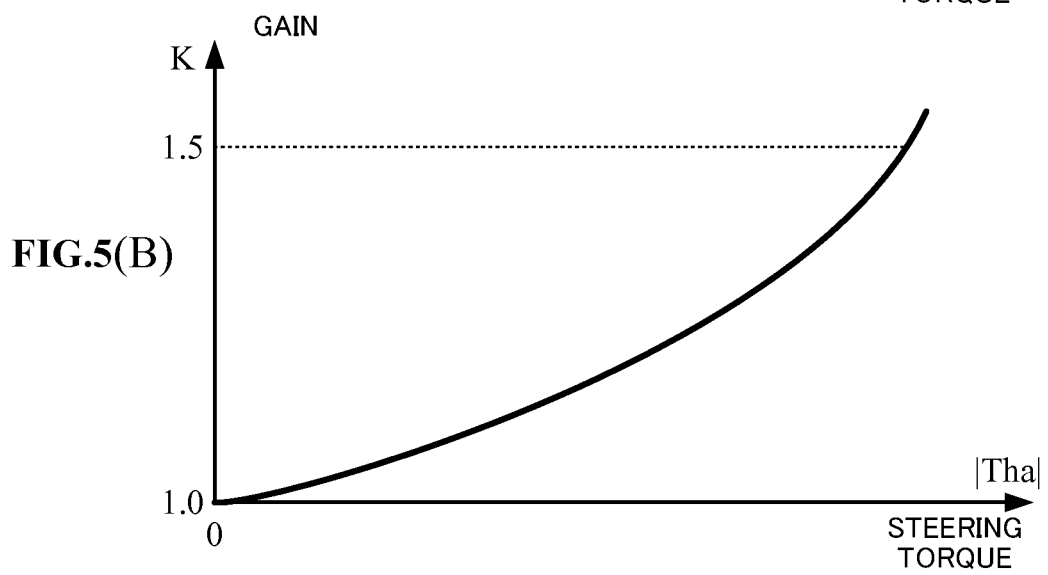

When the past-value initializing signal Pi is outputted from the torque value comparing section 303, a past-value holding section ($Z^{-1}$) in the integral calculating section 306 is initialized to "0". The torque-sensitive type gain section 305 comprises a variable gain section 305-1 to make again K to increase to "1.0" or more as the absolute value |Tha| of the steering torque Th becomes great, and a multiplying section 305-2 to output the integral input value Ctb by multiplying the limiter output value Cta with the gain K from the variable gain section 305-1. The variable gain section 305-1 has, for example, a linear characteristic as shown in FIG. 5(A) or a non-linear characteristic as shown in FIG. 5(B). Because the variable gain section 305-1 has these characteristics, the effect of the integration also increases as the steering torque Th (the absolute value |Tha|) becomes great. The switch judging section 307 compares the integral output value Iout with the integral threshold Sth, and switches from the automatic steering mode to the manual steering mode since the switching condition is established when the integral output value Iout is equal to or more than the integral threshold Sth. On the other hand, when the integral output value Iout is less than the integral threshold Sth, the switching condition is failure and the automatic steering mode is continued. Namely, the switch judging section 307 operates as the following table 2.

TABLE 2

When Iout ≥ Sth, the switching condition is established.
When Iout < Sth, the switching condition is failure.

By providing the absolute value section 302, it is possible to judge with only the magnitude of the value. Therefore, it is possible to judge by comparing the magnitudes with a single torque threshold Tth. Further, as the configuration, it may judge the absolute value with an internal processing of the torque value comparing section 303 by combining the absolute value section 302 and the torque value comparing section 303. If the torque threshold Tth is set for plural values of plus and minus, the absolute value section is unnecessary, and the obtaining of the absolute value may be after the integral calculation.

Figure 6:
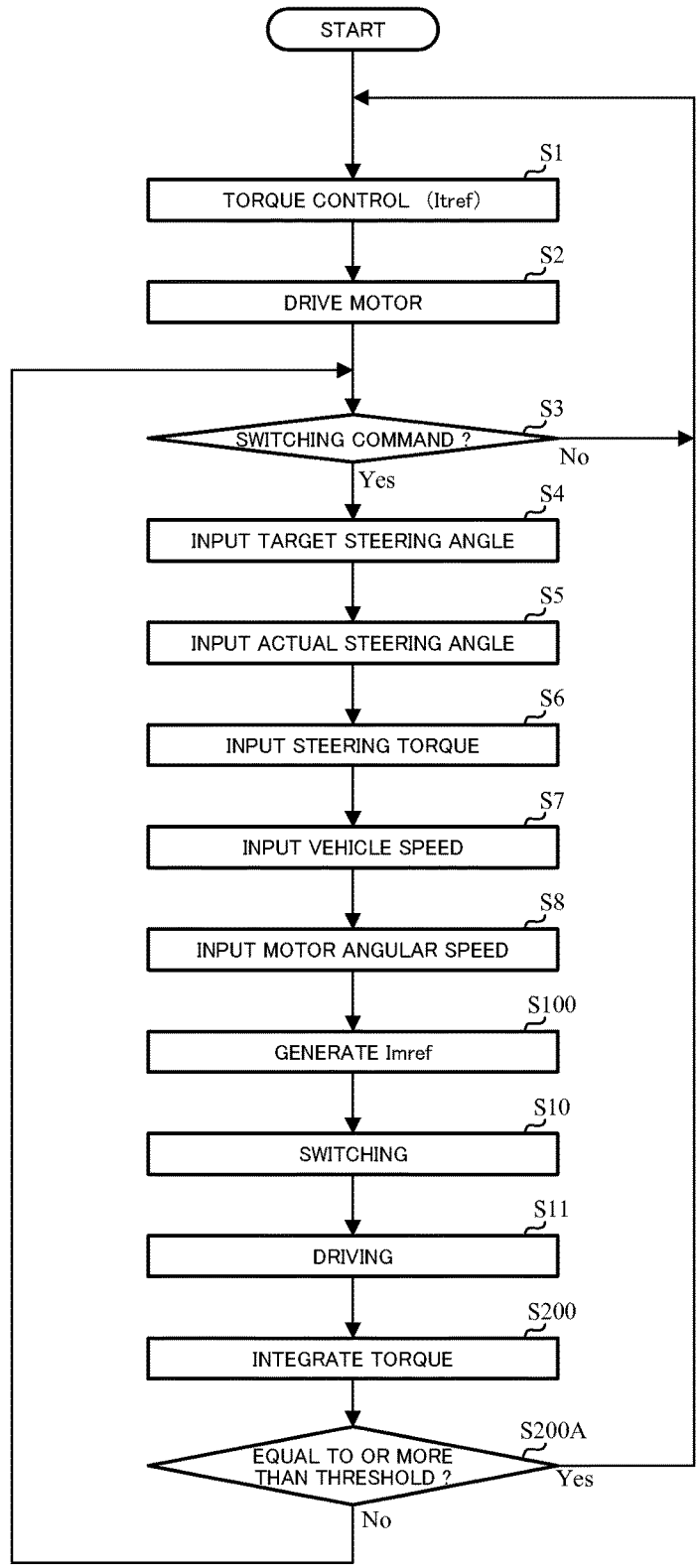
FIG. 6 is a flowchart showing an operation example (the first embodiment) of the present invention.

In such a configuration, an entire operation example of the present invention will be described with reference to a flowchart shown in FIG. 6.

When the operation of the steering system starts, the torque control (the manual steering mode) by the torque control section 141 is carried out (Step S1), and the motor 150 is driven by means of the current control/driving section 143 with the motor current command value Itref (Step S2). The above operations are repeatedly performed until the switching command SW is outputted from the switching command section 131 (Step S3).

When becoming the automatic steering mode and then the switching command SW is outputted from the switching command section 131, the target steering angle θt is inputted into the steering angle control section 200 from the target steering angle generating section 132 (Step S4), the actual steering angle θr is inputted into the steering angle control section 200 from the steering angle sensor 152 (Step S5), the steering torque Th is inputted from the torque sensor 154 (Step S6), the vehicle speed Vel is inputted from the vehicle speed sensor 153 (Step S7), the motor angular speed ω is inputted into the steering angle control section 200 from the motor angular speed calculating section 144 (Step S8), and the motor current command value Imref is generated by the steering angle control section 200 (Step S100). Moreover, the target steering angle θt, the actual steering angle θr, the steering torque Th, the vehicle speed Vel and the motor angular speed ω can be inputted in an arbitrary order.

Thereafter, the switching section 142 is switched to the automatic steering mode by the switching command SW from the switching command section 131 (Step S10), and the motor 150 is driven by means of the current control/driving section 143 with the motor current command value Imref from the steering angle control section 200 (Step S11).

During thus automatic steering mode, the steering torque Th is performed the torque integral operation in the torque integral judging section 300, and it is judged whether the torque integrated value (the integral output value Iout) which is integrated is equal to or more than a predetermined threshold or not (Step S200A). In a case that the torque integrated value is equal to or more than the predetermined threshold, the steering torque judging signal TD is outputted from the torque integral judging section 300. Then, the switching section 142 is switched, the above operations are repeated by returning to the Step S1 and becomes the manual steering mode. In a case that the torque integrated value is less than the predetermined threshold, the above operations (the automatic steering mode) are repeated by returning to the Step S3.

Figure 7:
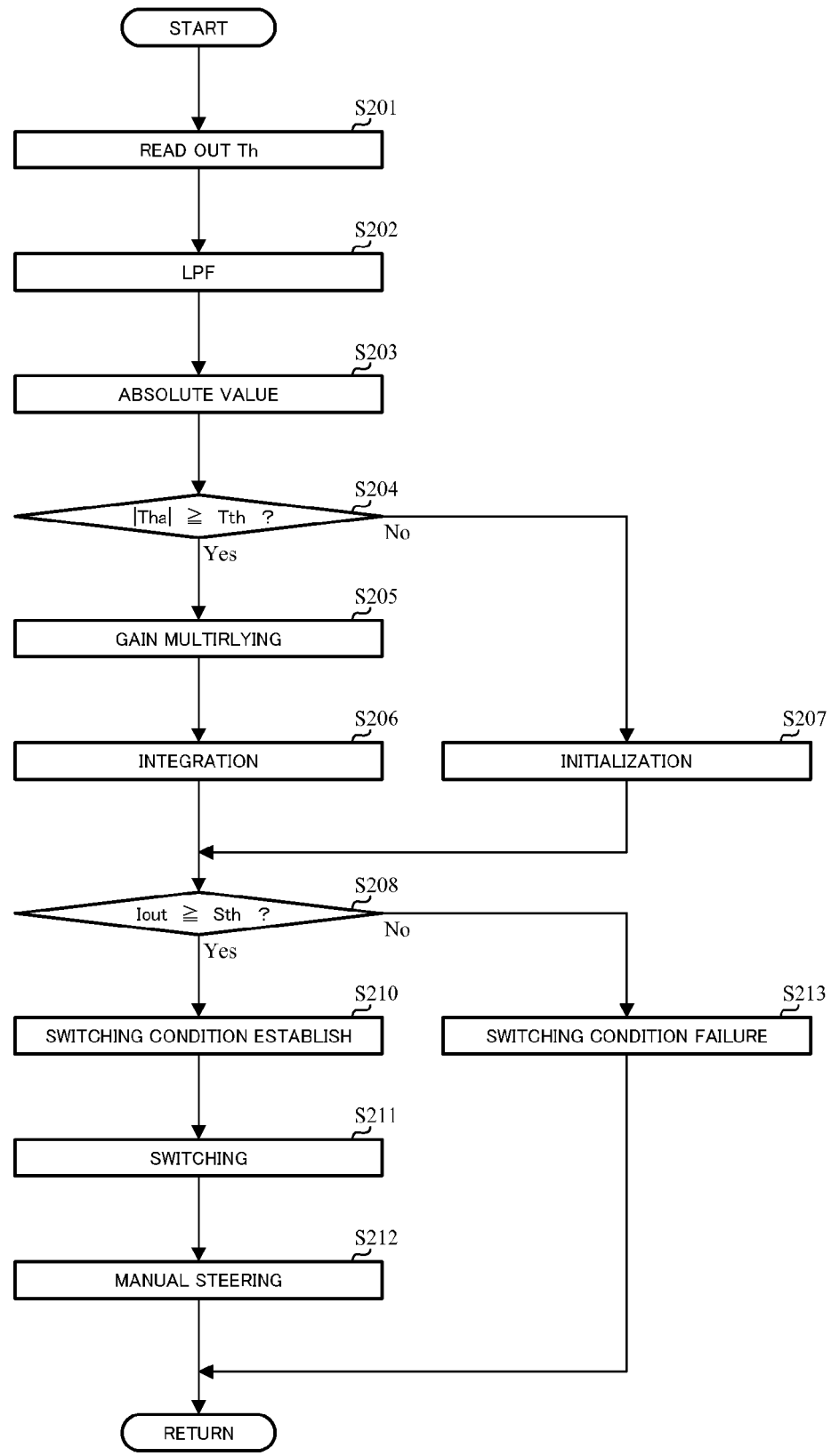
FIG. 7 is a flowchart showing an operation example of the torque integral judging section.

Next, an example operation of the torque integral judging section (Steps S200 and S200A in FIG. 6) will be described in detail with reference to a flowchart shown in FIG. 7.

The steering torque Th being inputted in advance (Step S6) is read out (Step S201), a noise removing is carried out in the LPF 301 (Step S202), and the absolute value |Tha| of the steering torque Tha from the LPF 301 is obtained in the absolute value section 302 (Step S203). The torque threshold Tth is inputted in advance into the torque value comparing section 303, and the torque value comparing section 303 judges whether the absolute value |Tha| is equal to or more than the torque threshold Tth or not (Step S204). If the absolute value |Tha| is equal to or more than the torque threshold Tth, the maximum value of the output signal Ct is limited in the limiter 304 as the absolute value |Tha| and the limiter output value Cta is gain (K)-multiplied in the torque-sensitive type gain section 305 in accordance with the absolute value |Tha| of the steering torque Tha (Step S205). That is, the limiter output value Cta is inputted into the variable gain section 305-1 and the multiplying section 305-2, the variable gain section 305-1 outputs the gain K (equal to or more than "1.0"), such as the characteristic shown in FIG. 5(A) or FIG. 5(B), in accordance with the absolute value |Tha|. The gain K is multiplied with the limiter output value Cta in the multiplying section 305-2 and the multiplied value is outputted as the integral input value Ctb.

The integral input value Ctb gain-multiplied in the torque-sensitive type gain section 305 is inputted into the integral calculating section 305 and the integral operation is performed in the integral calculating section 305 (Step S206). Further, if the absolute value |Tha| is less than the torque threshold Tth, the output signal Ct is set to "0" and the integral operation is not performed, and further the integral calculating section 306 is initialized by outputting the past-value initializing signal Pi (Step S207). The initialization is performed by resetting the past-value holding section ($Z^{-1}$) within the integral calculating section 306 to "0".

The integral output value Iout from the integral calculating section 306 is inputted into the switch judging section 307, the switch judging section 307 judges whether the integral output value Iout is equal to or more than the integral threshold Sth or not (Step S208). If the integral output value Iout is equal to or more than the integral threshold Sth, the switching condition is established (Step S210). In this case, the switching section 142 is switched by the steering torque judging signal TD (Step S211), and the mode is switched from the automatic steering mode to the manual steering mode (Step S212). Further, if the integral output value Iout is less than the integral threshold Sth, the switching condition is failure and the switching is not performed (Step S213).

Figure 8:
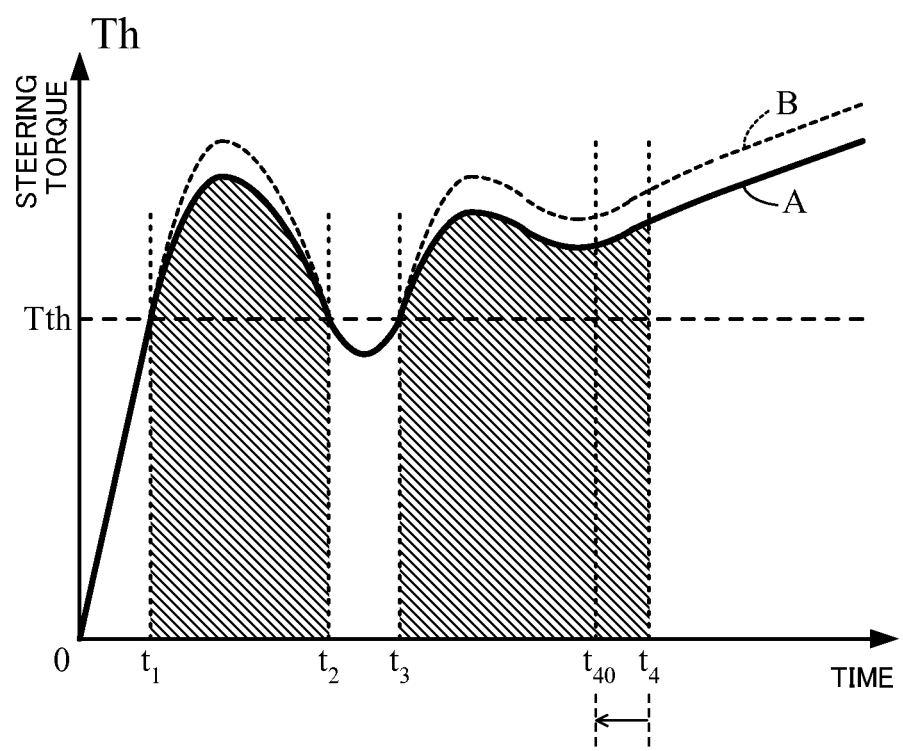
FIG. 8 is a time chart showing operation examples of the steering torque and the integration.

FIG. 8 shows an operation example (a real line characteristic A, a dashed line characteristic B) a time change of the steering torque Th (Tha) with respect to the torque threshold Tth in relation to the integration, the characteristic A will be firstly explained.

Since the steering torque Th is less than the torque threshold Tth from a start to a time point $t_1$, the integration is not performed. Since the steering torque Th is equal to or more than the torque threshold Tth from the time point $t_1$ to a time point $t_2$, the integration is performed. However, because the integrated value is less than the integral threshold Sth, the switching condition is failure. Further, since the steering torque Th is less than the torque threshold Tth from the time point $t_2$ to a time point $t_3$, the integration is not performed, and the integration is performed after the time point $t_3$ since the steering torque Th is equal to or more than the torque threshold Tth. The integrated value is equal to or more than a predetermined value (the integral threshold Sth) at a time point $t_4$, the switching condition is established. That is, although the shaded portion in FIG. 8 is an integration region (area), since the integrated value is less than the integral threshold. Sth at the time point $t_2$, the switching condition is failure, and since the integrated value is equal to or more than the integral threshold Sth at the time point $t_4$, the switching condition is established.

In the present invention, the torque-sensitive type gain section 305 having the characteristic that the integration input value Ctb becomes great as the steering torque Th (the absolute value |Tha|) becomes great, is provided. Accordingly, the steering torque Th becomes great by being enhanced as the broken line characteristic B in the great region for the real line characteristic A of FIG. 8, and the integration value entirely becomes great and a time to reach at the integration threshold Sth becomes short. For example, the characteristic that the integrated value is the integral threshold Sth at the time point $t_4$, reaches at the integral threshold Sth at the time point $t_{40}$ before the time point $t_4$ and the switching condition is established. Thus, it has more effects for the great steering torque Th.

Figure 9:
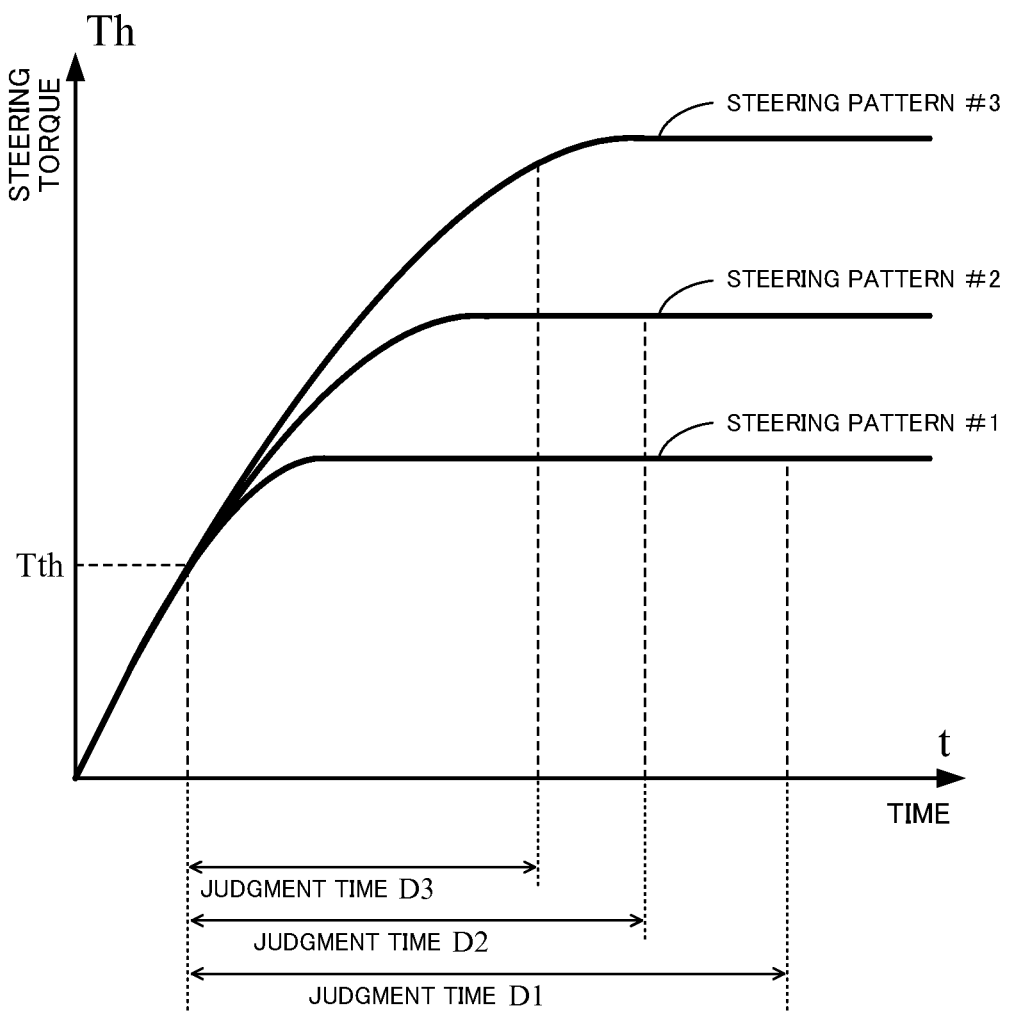
FIG. 9 is a characteristic diagram explaining the effects of the present invention.

FIG. 9 is a timing chart to show relations between steering patterns #1 to #3 of the steering torque Th and judgment times D1 to D3, and the torque threshold Tth is given. The timing that the steering torque Th reaches at the torque threshold Tth is the same, thereafter the steering torques are greater than the torque threshold Tth and the integral calculations are started when the steering torques reach at the torque threshold Tth. From this FIG. 9, it is understood that the judgment time becomes short as the steering torque Th is great. The reason is that the change rate is great as the steering torque Th is great and early reaches at the integral threshold Sth.

Furthermore, when the steering mode is switched at the switching section 142, it may be gradually changed with a fade gain. Although the absolute value |Tha| of the steering torque Th is inputted into the torque-sensitive type gain section 305, it is possible to change a gain by using an input of the steering torque Th.

Figure 10:
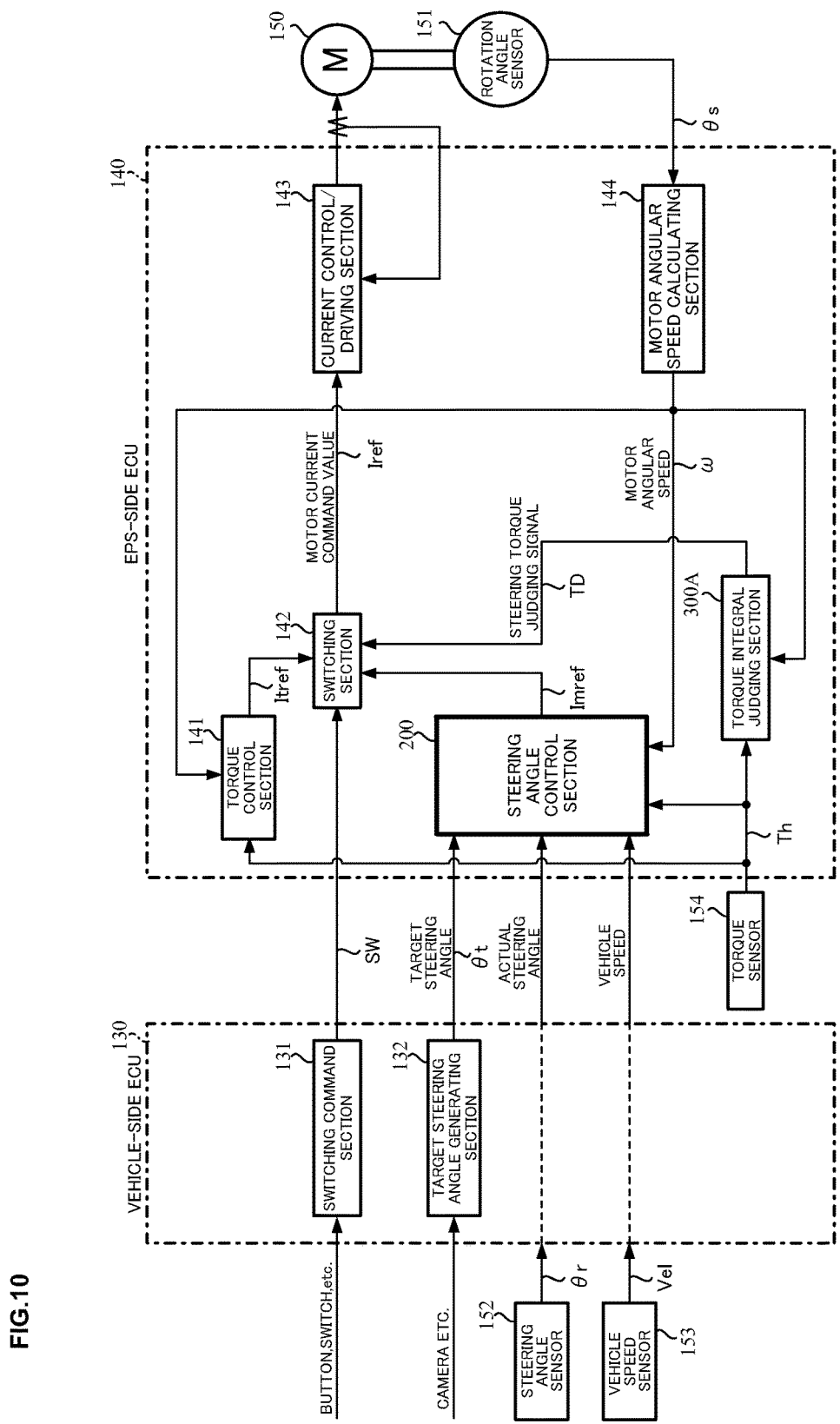
FIG. 10 is a block diagram showing another configuration example (the second embodiment) of the present invention.

FIG. 10 shows a configuration example (the second embodiment) of the present invention by corresponding to FIG. 3 of the first embodiment, and the second embodiment is the same to the first embodiment shown in FIG. 3 except for a torque integral judging section 300A. The torque integral judging section 300A outputs a steering torque judging signal TD based on the steering torque Th and motor angular speed (rotation speed) ω as a motor-state information.

Figure 11:
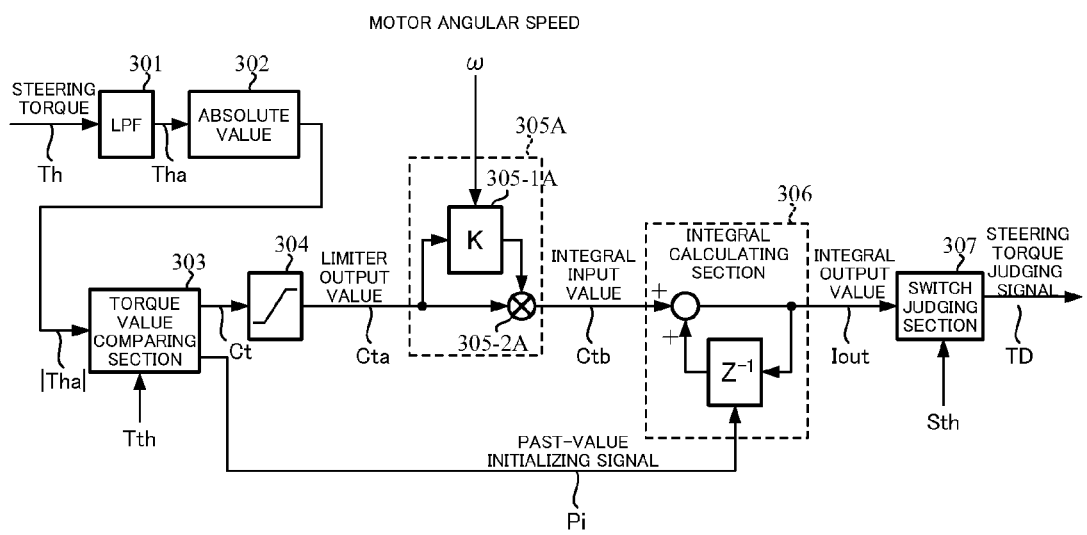
FIG. 11 is a block diagram showing another configuration example of the torque integral judging section.
Figure 12A:
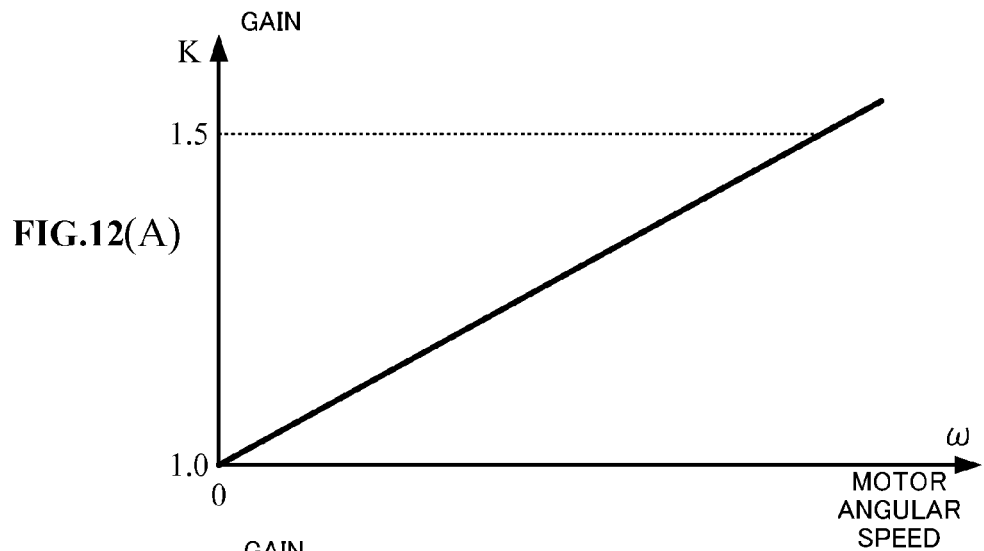
FIGS. 12(A) and 12(B) are diagrams showing characteristic examples (linear, non-linear) of the motor angular speed-sensitive type gain section.
Figure 12B:
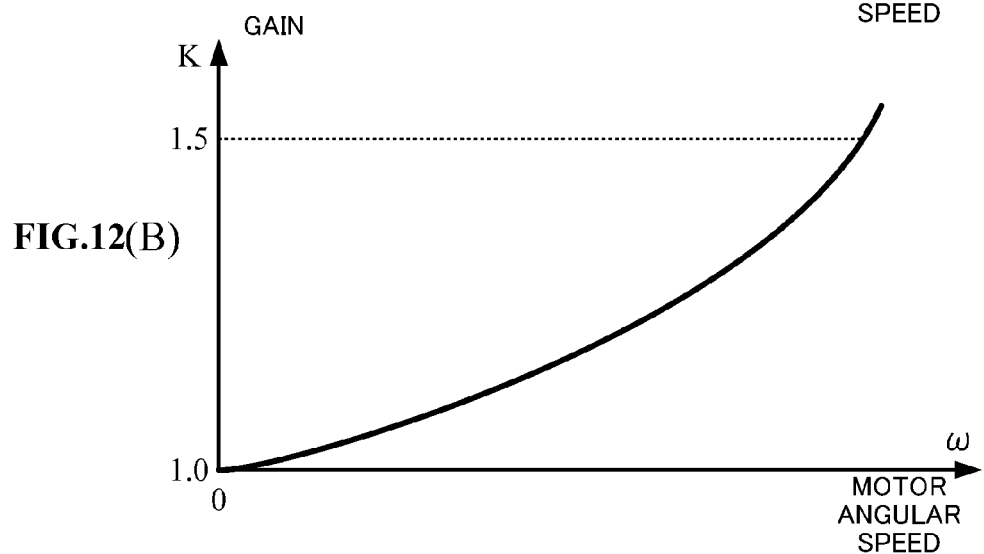

The torque integral judging section 300A is a configuration as shown in FIG. 11 and is almost near to the same of FIG. 4. The torque-sensitive type gain section 305 is alternated to a motor angular speed-sensitive type gain section 305A which is sensitive to the motor angular speed ω. The motor angular speed-sensitive type gain section 305A comprises a variable gain section 305-1A to increase the gain K to be equal to or more than "1.0" as the motor angular speed ω becomes great, and a multiplying section 305-2A to output the integral input value Ctb by multiplying the limiter output value Cta with the gain K from the variable gain section 305-1A. The variable gain section 305-1A has a linear change characteristic as shown in FIG. 12(A), or a non-linear change characteristic as shown in FIG. 12(B). Because these characteristics are given as stated-above, the effect of the integration becomes great as the motor angular speed ω becomes great. The switch judging section 307 compares the integral output value Iout with the integral threshold Sth as the same to the first embodiment, the switching condition is established when the integral output value Iout is equal to or more than the integral threshold Sth, and the automatic steering mode is switched to the manual steering mode. The switching condition is failure when the integral output value Iout is less than the integral threshold Sth, and the automatic steering mode is continued.

In such a configuration, although an operation of the second embodiment is similar to the same of the first embodiment, only the operation of the motor angular speed-sensitive type gain section 305A within the torque integral judging section 300A is different from the first embodiment. Namely, the motor angular speed-sensitive type gain section 305A gain (K)-multiplies the limiter output value Cta in accordance with the motor angular speed ω. The limiter output value Cta is inputted into the variable gain section 305-1A and the multiplying section 305-2A, and the variable gain section 305-1A outputs the gain K (equal to or more than "1.0") with the characteristic as shown in FIG. 12(A) or FIG. 12(B) in accordance with the motor angular speed ω. The gain K is multiplied the limiter output value Cta at the multiplying section 305-2A, and the multiplied value is outputted as the integral input value Ctb. Thus, when the motor angular speed ω is great, that is, at a time when the motor is rotated in a high speed, it is possible to shorten the judgment time.

Figure 13:
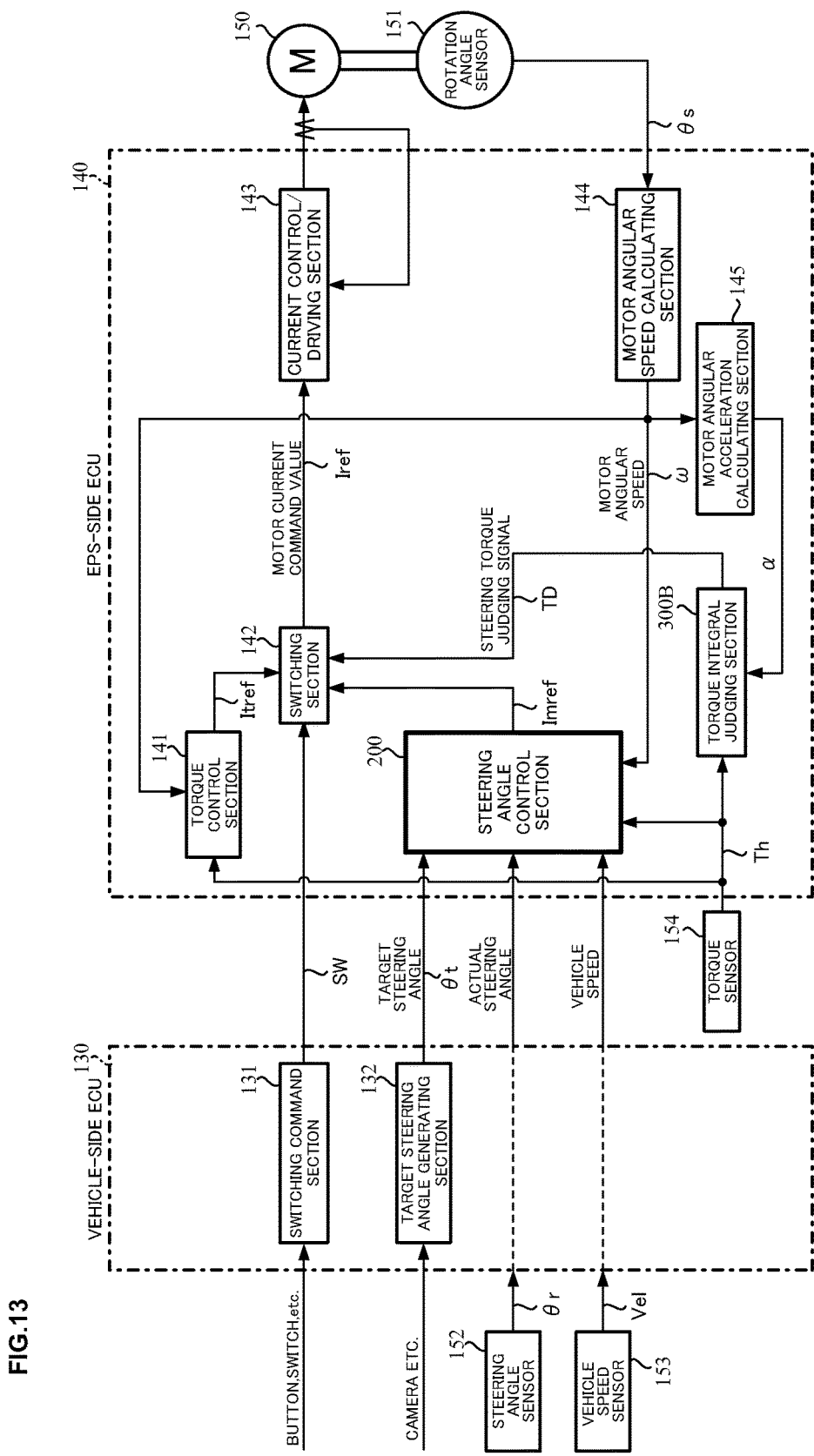
FIG. 13 is a flowchart showing an operation example (the third embodiment) of the present invention.

FIG. 13 shows a configuration example (the third embodiment) of the present invention by corresponding to FIG. 3, and the third embodiment is the same to the first embodiment shown in FIG. 3 except for a torque integral judging section 300B and a motor angular acceleration calculating section 145. The torque integral judging section 300B outputs a steering torque judging signal TD based on the steering torque Th and motor angular acceleration α as the motor-state information.

Figure 14:
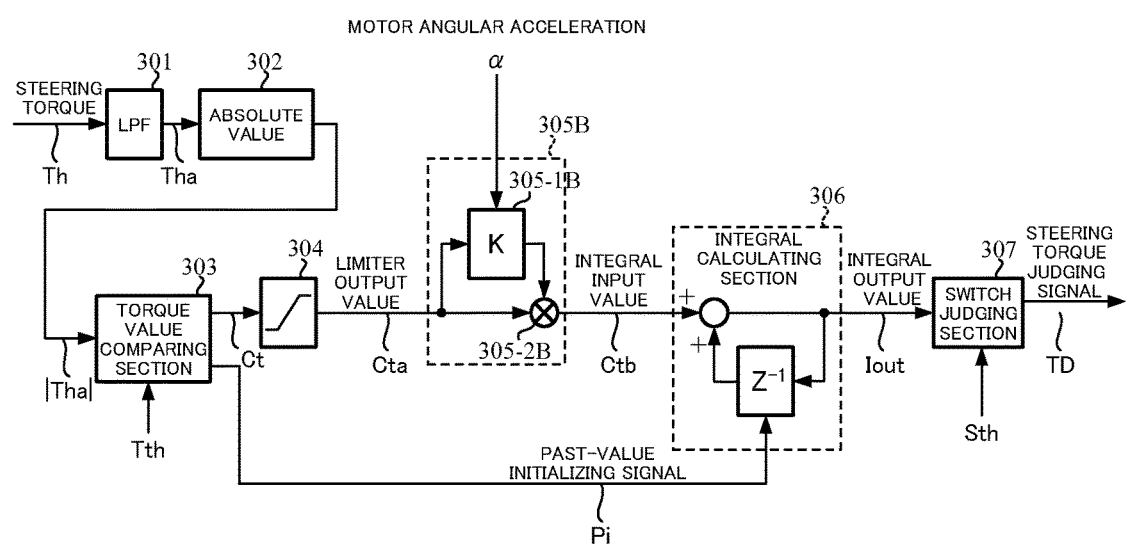
FIG. 14 is a block diagram showing another configuration example of the torque integral judging section.
Figure 15:
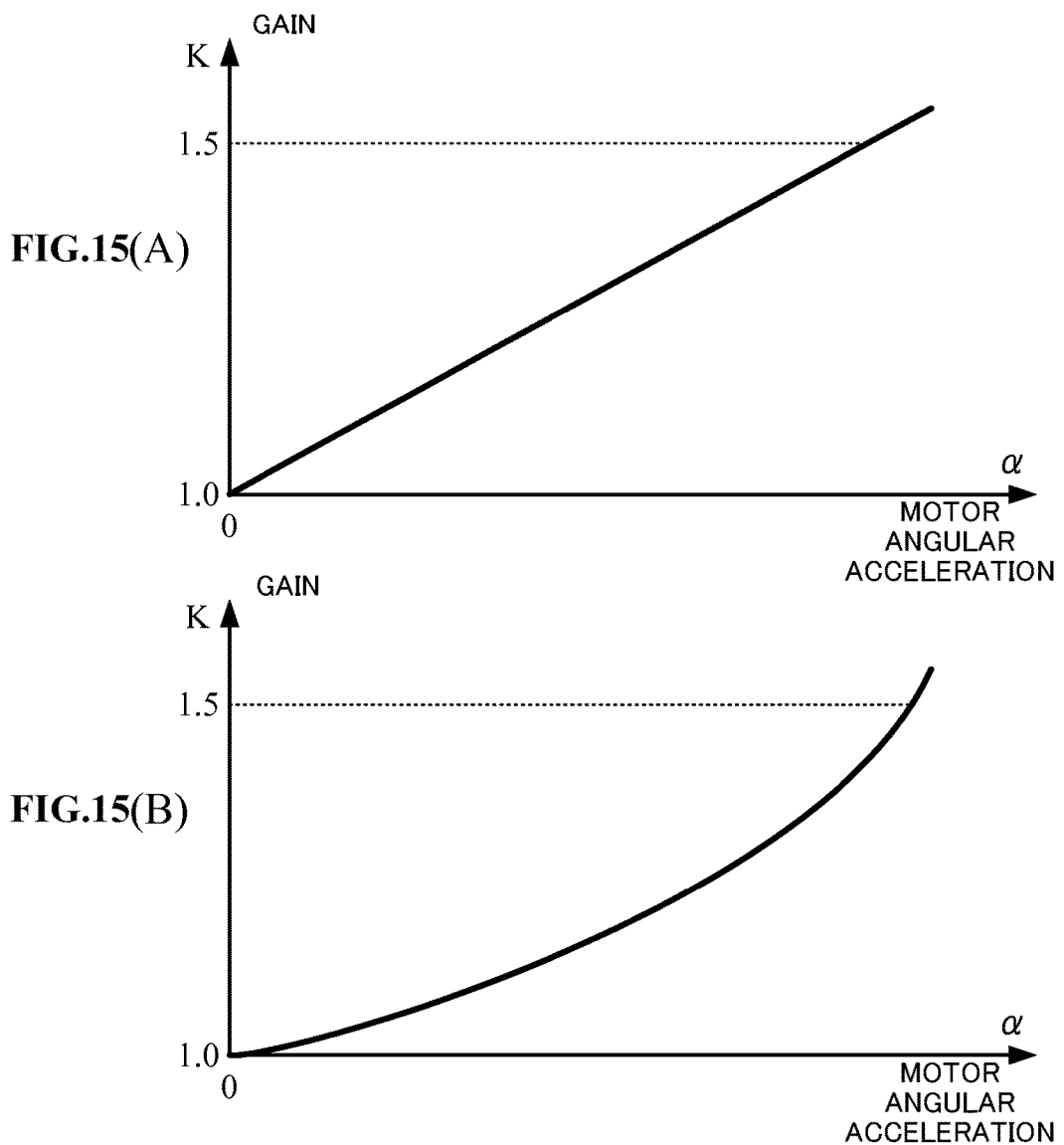
FIGS. 15(A) and 15(B) are diagrams showing characteristic examples (linear, non-linear) of the motor angular acceleration-sensitive type gain section.

The torque integral judging section 300B is a configuration as shown in FIG. 14 and is almost near to the same of FIG. 11. The motor angular speed-sensitive type gain section 305A is alternated to a motor angular acceleration-sensitive type gain section 305B which is sensitive to the motor angular acceleration α. The motor angular acceleration-sensitive type gain section 305B comprises a variable gain section 305-1B to increase the gain K to be equal to or more than "1.0" as the motor angular acceleration α becomes great, and a multiplying section 305-2B to output the integral input value Ctb by multiplying the limiter output value Cta with the gain K from the variable gain section 305-1B. The variable gain section 305-1B has a linear change characteristic as shown in FIG. 15(A), or a non-linear change characteristic as shown in FIG. 15(B). Because these characteristics are given as stated-above, the effect of the integration becomes great as the motor angular acceleration α becomes great. The switch judging section 307 compares the integral output value Iout with the integral threshold Sth as the same to the first and the second embodiments, the switching condition is established when the integral output value Iout is equal to or more than the integral threshold Sth, and the automatic steering mode is switched to the manual steering mode. The switching condition is failure when the integral output value Iout is less than the integral threshold Sth, and the automatic steering mode is continued.

In such a configuration, although an operation of the third embodiment is similar to the same of the first and the second embodiments, only the calculation of the motor angular acceleration α in the motor angular acceleration calculating section 145 and the operation of the motor angular acceleration-sensitive type gain section 305B within the torque integral judging section 300B are different from the first and the second embodiments. Namely, the motor angular acceleration-sensitive type gain section 305B gain (K)-multiplies the limiter output value Cta in accordance with the motor angular acceleration α. The limiter output value Cta is inputted into the variable gain section 305-1B and the multiplying section 305-2B, and the variable gain section 305-1B outputs the gain K (equal to or more than "1.0") with the characteristic as shown in FIG. 15(A) or FIG. 15(B) in accordance with the motor angular acceleration α. The gain K is multiplied the limiter output value Cta at the multiplying section 305-2B, and the multiplied value is outputted as the integral input value Ctb. Thus, when the motor angular acceleration α is great, that is, at a time when the motor is rotated in a high speed, it is possible to shorten the judgment time.

Figure 16:
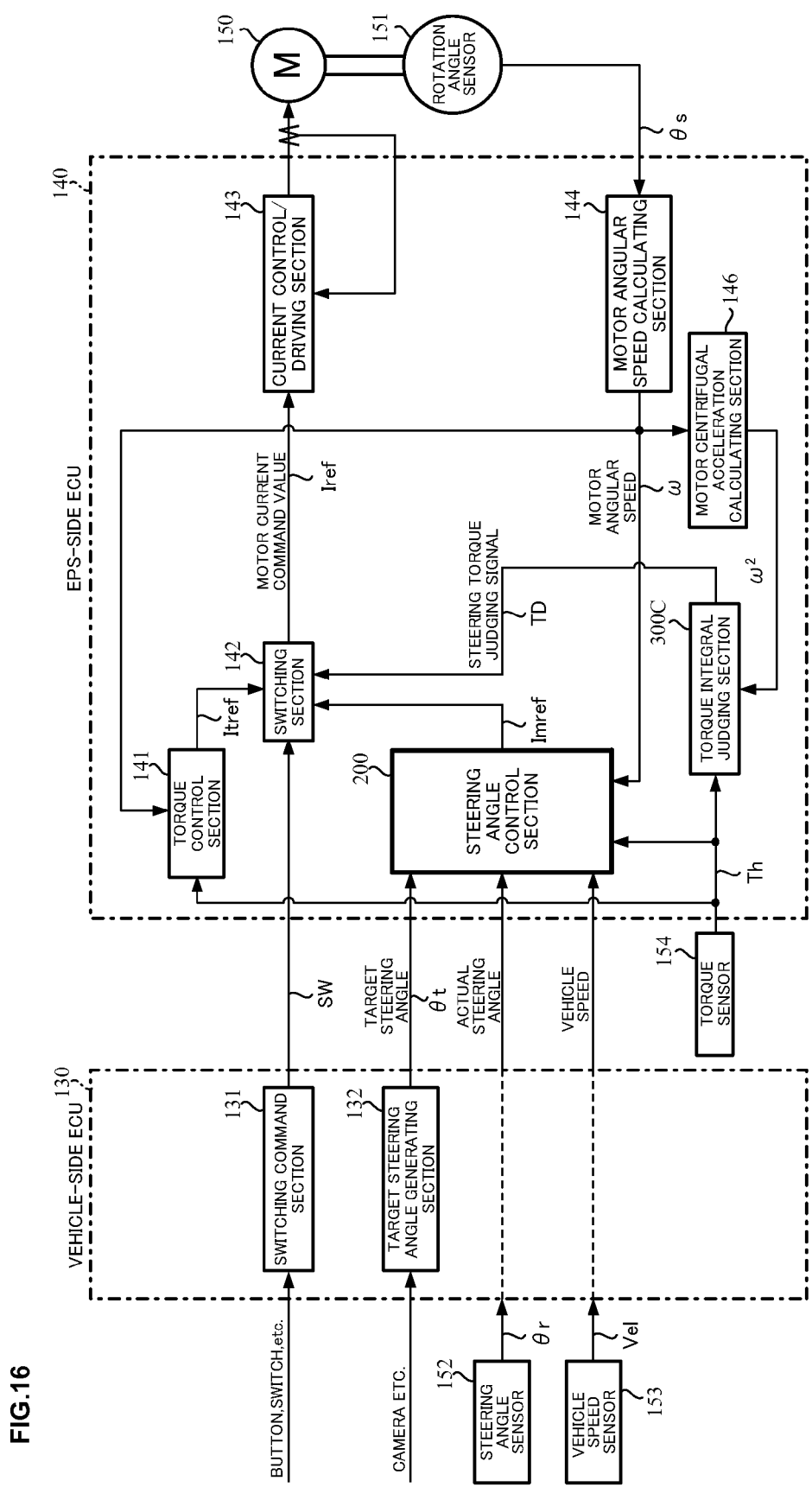
FIG. 16 is a flowchart showing an operation example (the forth embodiment) of the present invention.

FIG. 16 shows a configuration example (the fourth embodiment) of the present invention by corresponding to FIG. 3, and the fourth embodiment is the same to the first embodiment shown in FIG. 3 except for a torque integral judging section 300C and a motor centrifugal acceleration calculating section 146. The torque integral judging section 300C outputs a steering torque judging signal TD based on the steering torque Th and the motor centrifugal acceleration $\omega^2$ as the motor-state information.

Figure 17:
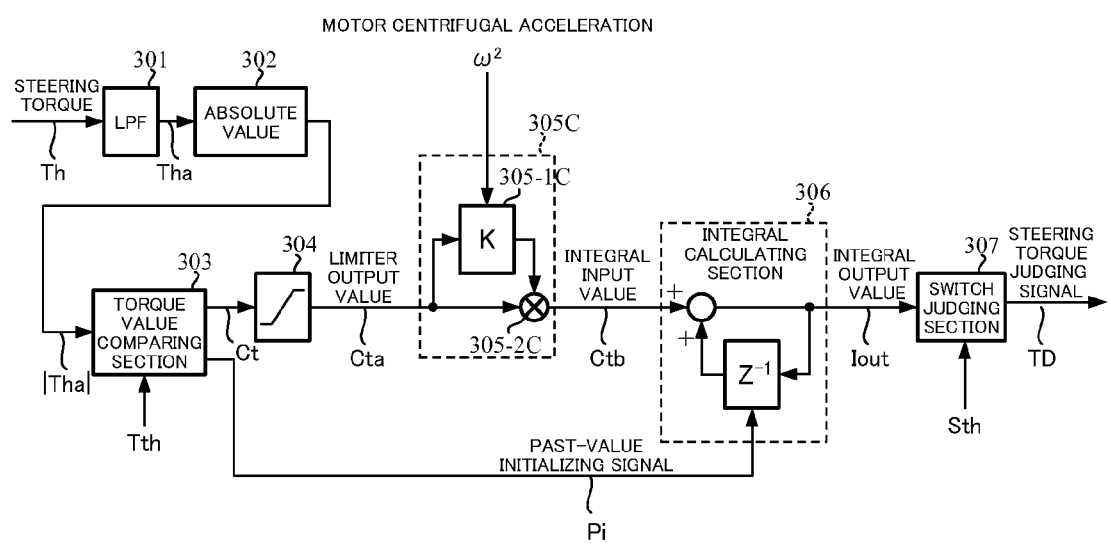
FIG. 17 is a block diagram showing another configuration example of the torque integral judging section.

The torque integral judging section 300C is a configuration as shown in FIG. 17 and is almost near to the same of FIG. 11 and FIG. 14. The motor centrifugal acceleration-sensitive type gain section 305C which is sensitive to the motor centrifugal acceleration $\omega^2$ is provided. The motor centrifugal acceleration-sensitive type gain section 305C comprises a variable gain section 305-1C to increase the gain K to be equal to or more than "1.0" as the motor centrifugal acceleration $\omega^2$ becomes great, and a multiplying section 305-2C to output the integral input value Ctb by multiplying the limiter output value Cta with the gain K from the variable gain section 305-1C. The variable gain section 305-1C has a linear change characteristic as shown in FIG. 18(A), or a non-linear change characteristic as shown in FIG. 18(B). Because these characteristics are given as stated-above, the effect of the integration becomes great as the motor centrifugal acceleration $\omega^2$ becomes great. The switch judging section 307 compares the integral output value Iout with the integral threshold Sth similar to the first to the third embodiments, the switching condition is established when the integral output value Iout is equal to or more than the integral threshold Sth, and the automatic steering mode is switched to the manual steering mode. The switching condition is failure when the integral output value Iout is less than the integral threshold Sth, and the automatic steering mode is continued.

In such a configuration, although an operation of the fourth embodiment is similar to the same of the first to the third embodiments, only the calculation of the motor centrifugal acceleration $\omega^2$ in the motor centrifugal acceleration calculating section 146 and the operation of the motor centrifugal acceleration-sensitive type gain section 305C within the torque integral judging section 300C are different from the first to the third embodiments. Namely, the motor centrifugal acceleration-sensitive type gain section 305C gain (K)-multiplies the limiter output value Cta in accordance with the motor centrifugal acceleration $\omega^2$. The limiter output value Cta is inputted into the variable gain section 305-1C and the multiplying section 305-2C, and the variable gain section 305-1C outputs the gain K (equal to or more than "1.0") with the characteristic as shown in FIG. 18(A) or FIG. 18(B) in accordance with the motor centrifugal acceleration $\omega^2$. The gain K is multiplied the limiter output value Cta at the multiplying section 305-2C, and the multiplied value is outputted as the integral input value Ctb. Thus, when the motor centrifugal acceleration $\omega^2$ is great, that is, at a time when the motor is rotated in a high speed, it is possible to shorten the judgment time.

Further, when the steering mode is switched at the switching section 142, it may be gradually changed with a fade gain.

EXPLANATION OF REFERENCE NUMERALS 1 steering wheel (handle)
2 column shaft (steering shaft, handle shaft)
10,154 torque sensor
12,153 vehicle speed sensor
13 battery
20,150 motor
21 motor driving section
100 control unit (ECU)
110 torque system control unit
120 motor system control unit
151 rotation angle sensor 152 steering angle sensor
130 vehicle-side ECU
131 switching command section
132 target steering angle generating section
140 EPS-side ECU
141 torque control section
142 switching section
143 current control/driving section
144 motor angular speed calculating section
145 motor angular acceleration calculating section
146 motor centrifugal acceleration calculating section
300 torque integral judging section
303 torque value comparing section
305 torque-sensitive type gain section
306 integral calculating section
307 switch judging section

The invention claimed is:

1. An electric power steering apparatus that calculates a first motor current command value based on a steering torque and a vehicle speed, performs an assist control of a steering system by driving a motor on a basis of said first motor current command value, and has a function for switching between an automatic steering mode and a manual steering mode, comprising:
a steering angle control section that calculates a second motor current command value so as to bring an actual steering angle close to a target steering angle;
a torque integral judging section to output a steering torque judging signal by integrating said steering torque and comparing with a predetermined threshold; an
a switching section that inputs said first motor current command value and said second motor current command value, and is switched by a switching signal or said steering torque judging signal,
wherein said torque integral judging section comprises:
a torque value comparing section to output a predetermined signal by comparing an absolute value of said steering torque with a torque threshold; a torque-sensitive type gain section to input said predetermined signal and output an integral input value which is multiplied a torque-sensitive gain corresponding to said absolute value of said steering torque with said predetermined signal; an integral calculating section to integrate said integral input value from said torque-sensitive type gain section; and a switch judging section to output said steering torque judging signal by comparing an integrated value from said integral calculating section with an integral threshold,
wherein said switching section is switched in correspondence with a switching command of said automatic steering mode and said manual steering mode, or said steering torque judging signal.

2. The electric power steering apparatus according to claim 1, wherein said torque integral judging section includes a low pass filter (LPF) at a front of said torque value comparing sections.

3. The electric power steering apparatus according to claim 1, wherein said torque-sensitive type gain section to output said integral input value that becomes great in a linear or a non-linear as said steering torque becomes great.

4. The electric power steering apparatus according to claim 1, wherein said torque value comparing section has a function that outputs said absolute value when said absolute value is equal to or more than said torque threshold, brings an output to "0" when said absolute value is less than said torque threshold, and outputs a past-value initializing signal to initialize said integral calculating section.

5. The electric power steering apparatus according to claim 3, wherein said torque value comparing section has a function that outputs said absolute value when said absolute value is equal to or more than said torque threshold, brings an output to "0" when said absolute value is less than said torque threshold, and outputs a past-value initializing signal to initialize said integral calculating section.

6. The electric power steering apparatus according to claim 1, wherein said switch judging section has a function that outputs said steering torque judging signal when said integrated value is equal to or more than said integral threshold, and does not output said steering torque judging signal when said integrated value is less than said integral threshold.

7. The electric power steering apparatus according to claim 3, wherein said switch judging section has a function that outputs said steering torque judging signal when said integrated value is equal to or more than said integral threshold, and does not output said steering torque judging signal when said integrated value is less than said integral threshold.

8. The electric power steering apparatus according to claim 1, wherein said manual steering mode is performed by switching said switching section with said steering torque judging signal when said absolute value is equal to or more than said torque threshold and said integrated value is equal to or more than said integral threshold during said automatic steering mode.

9. The electric power steering apparatus according to claim 3, wherein said manual steering mode is performed by switching said switching section with said steering torque judging signal when said absolute value is equal to or more than said torque threshold and said integrated value is equal to or more than said integral threshold during said automatic steering mode.

10. An electric power steering apparatus that calculates a first motor current command value based on a steering torque and a vehicle speed, performs an assist control of a steering system by driving a motor on a basis of said first motor current command value, and has a function for switching between an automatic steering mode and a manual steering mode, comprising:
a steering angle control section that calculates a second motor current command value so as to bring an actual steering angle close to a target steering angle;
a torque integral judging section to output a steering torque judging signal by integrating said steering torque and comparing with a predetermined threshold; and
a switching section that inputs said first motor current command value and said second motor current command value, and is switched by a switching signal or said steering torque judging signal,
wherein said torque integral judging section comprises:
a torque value comparing section to output a predetermined signal by comparing an absolute value of said steering torque with a torque threshold; a motor-state information-sensitive type gain section to input said predetermined signal and output an integral input value which is multiplied a motor-state information-sensitive gain corresponding to a motor-state information with said predetermined signal; an integral calculating section to integrate said integral input value from said motor-state information-sensitive type gain section; and a switch judging section to output said steering torque judging signal by comparing an integrated value from said integral calculating section with an integral threshold,
wherein said switching section is switched in correspondence with a switching command of said automatic steering mode and said manual steering mode, or said steering torque judging signal.

11. The electric power steering apparatus according to claim 10, wherein said motor-state information-sensitive type gain section to output said integral input value that becomes great in a linear or a non-linear as said motor-state information becomes great.

12. The electric power steering apparatus according to claim 10, wherein said motor-state information is a motor angular speed, and said motor-state information-sensitive type gain section is a motor angular speed-sensitive gain section.

13. The electric power steering apparatus according to claim 11, wherein said motor-state information is a motor angular speed, and said motor-state information-sensitive type gain section is a motor angular speed-sensitive gain section.

14. The electric power steering apparatus according to claim 10, wherein said motor-state information is a motor angular acceleration, and said motor-state information-sensitive type gain section is a motor angular acceleration-sensitive type gain section.

15. The electric power steering apparatus according to claim 10, wherein said motor-state information is a motor centrifugal acceleration, and said motor-state information-sensitive type gain section is a motor centrifugal acceleration-sensitive type gain section.

16. The electric power steering apparatus according to claim 10, wherein said torque integral judging section includes a low pass filter (LPF) at a front of said torque value comparing sections.

17. The electric power steering apparatus according to claim 10, wherein said torque value comparing section has a function that outputs said absolute value when said absolute value is equal to or more than said torque threshold, brings an output to "0" when said absolute value is less than said torque threshold, and outputs a past-value initializing signal to initialize said integral calculating section.

18. The electric power steering apparatus according to claim 11, wherein said torque value comparing section has a function that outputs said absolute value when said absolute value is equal to or more than said torque threshold, brings an output to "0" when said absolute value is less than said torque threshold, and outputs a past-value initializing signal to initialize said integral calculating section.

19. The electric power steering apparatus according to claim 10, wherein said switch judging section has a function that outputs said steering torque judging signal when said integrated value is equal to or more than said integral threshold, and does not output said steering torque judging signal when said integrated value is less than said integral threshold.

20. The electric power steering apparatus according to claim 11, wherein said switch judging section has a function that outputs said steering torque judging signal when said integrated value is equal to or more than said integral threshold, and does not output said steering torque judging signal when said integrated value is less than said integral threshold.

21. The electric power steering apparatus according to claim 10, wherein said manual steering mode is performed by switching said switching section with said steering torque judging signal when said absolute value is equal to or more than said torque threshold and said integrated value is equal to or more than said integral threshold during said automatic steering mode.

22. The electric power steering apparatus according to claim 11, wherein said manual steering mode is performed by switching said switching section with said steering torque judging signal when said absolute value is equal to or more than said torque threshold and said integrated value is equal to or more than said integral threshold during said automatic steering mode.

* * * * *